United States Patent
Sankolli et al.

(10) Patent No.: US 9,028,210 B2
(45) Date of Patent: May 12, 2015

(54) TURBOMACHINE ALIGNMENT PIN

(75) Inventors: Prashant Prabhakar Sankolli, Bangalore (IN); Steven Sebastian Burdgick, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 447 days.

(21) Appl. No.: 13/495,221

(22) Filed: Jun. 13, 2012

(65) Prior Publication Data
US 2013/0336784 A1    Dec. 19, 2013

(51) Int. Cl.
*F01D 25/24*   (2006.01)
*F16B 13/08*   (2006.01)
*F16B 19/02*   (2006.01)
*F16B 13/06*   (2006.01)

(52) U.S. Cl.
CPC .......... *F16B 13/0858* (2013.01); *F16B 13/065* (2013.01); *F16B 19/02* (2013.01); *F05D 2230/64* (2013.01)

(58) Field of Classification Search
CPC .... F16B 13/0858; F16B 13/065; F16B 19/02; F05D 2230/64
USPC .............. 415/209.2; 411/55, 60.1, 60.2, 57.1
See application file for complete search history.

(56) References Cited

U.S. PATENT DOCUMENTS

| | | | |
|---|---|---|---|
| 1,513,669 A | | 10/1924 | Nicewarner et al. |
| 3,042,370 A | * | 7/1962 | Welsh .................. 415/209.4 |
| 3,298,725 A | * | 1/1967 | Boteler .................. 403/282 |
| 4,050,660 A | * | 9/1977 | Eggmann et al. ........... 248/676 |
| 4,408,937 A | * | 10/1983 | Hainke et al. ................ 411/42 |
| 4,653,969 A | | 3/1987 | Summerlin et al. |
| 4,818,163 A | | 4/1989 | Bereiter et al. |
| 5,271,714 A | * | 12/1993 | Shepherd et al. .......... 415/209.2 |
| 5,509,782 A | * | 4/1996 | Streeter .................... 415/213.1 |
| 6,074,119 A | * | 6/2000 | Schlanger .................. 403/297 |
| 2001/0022924 A1 | * | 9/2001 | Wieser ..................... 411/60.1 |
| 2005/0152777 A1 | * | 7/2005 | Thompson .............. 415/173.3 |

FOREIGN PATENT DOCUMENTS

GB        1358892 A  *  7/1974

* cited by examiner

*Primary Examiner* — Liam McDowell
(74) *Attorney, Agent, or Firm* — Ernest G. Cusick; Hoffman Warnick LLC

(57) ABSTRACT

Various embodiments include an alignment pin for a turbomachine. In some embodiments, the alignment pin includes a hollowed head section for engaging a diaphragm slot in the turbomachine. In these embodiments, the alignment pin further includes an expandable sleeve section connected with the hollowed head, the expandable sleeve section for engaging a casing slot in the turbomachine.

12 Claims, 4 Drawing Sheets

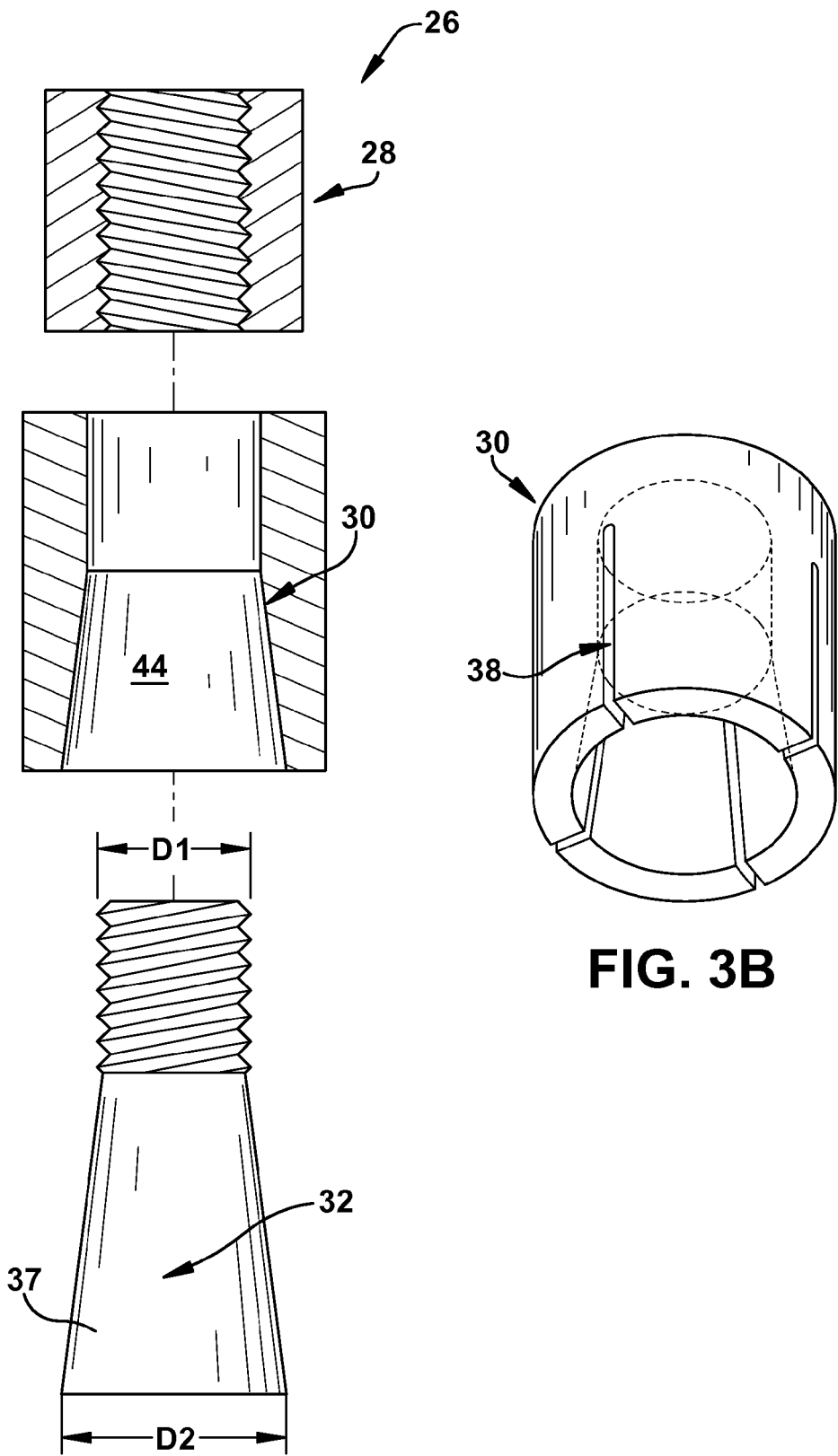

TURBOMACHINE ALIGNMENT PIN

FIELD OF THE INVENTION

The subject matter disclosed herein relates to turbomachines. More particularly, aspects of the invention include alignment mechanisms for a turbomachine stage, such as a stage in a steam turbine.

BACKGROUND OF THE INVENTION

Steam turbine designs include static nozzle assemblies that direct the flow of a working fluid such as steam into rotating buckets that are connected to a rotor. In steam turbines, the nozzle (airfoil) construction is typically called a "diaphragm" or "nozzle assembly" stage. Turbine diaphragms are assembled in two halves around the rotor, creating a horizontal joint between these two halves. Diaphragm centering pins are used to position the diaphragms in the transverse direction during installation. These centering pins are also designed to take the torque load generated by the diaphragm.

The centering pin is traditionally installed in an area of the diaphragm assembly with a small interference. The centering pin is traditionally cooled (e.g., frozen) to a point in which it contracts to fit in this area of small clearance. This often requires the use of dry ice or another severe cooling mechanism during installation, e.g., in the field. However, the unavailability and relatively high cost of these severe cooling mechanisms can be undesirable. Additionally, freezing and thawing of the centering pin can cause mis-alignment of the turbine diaphragm.

BRIEF DESCRIPTION OF THE INVENTION

Various embodiments include an alignment pin for a turbomachine. In some embodiments, the alignment pin includes a hollowed head section for engaging a diaphragm slot in the turbomachine. In these embodiments, the alignment pin further includes an expandable sleeve section connected with the hollowed head, the expandable sleeve section for engaging a casing slot in the turbomachine.

A first aspect of the invention includes an alignment pin for a turbomachine, the alignment pin including: a hollowed head section for engaging a diaphragm slot in the turbomachine; and an expandable sleeve section connected with the hollowed head, the expandable sleeve section for engaging a casing slot in the turbomachine.

A second aspect of the invention includes an alignment apparatus for a turbomachine, the alignment apparatus including: a hollowed head for engaging a diaphragm slot in the turbomachine; an expandable sleeve member connected with the hollowed head, the expandable sleeve having an inner slot, the expandable sleeve for engaging a casing slot in the turbomachine; and an expansion member within a portion of the inner slot, the expansion member for modifying an outer diameter of the expandable sleeve member within the casing slot.

A third aspect of the invention includes a turbomachine having: a turbine diaphragm segment; a turbine casing segment substantially containing the turbine diaphragm segment; and an alignment pin for aligning the turbine diaphragm segment with the turbine casing segment, the alignment pin including: a hollowed head section for engaging a slot in the turbine diaphragm segment; and an expandable sleeve section connected with the hollowed head, the expandable sleeve section for engaging a slot in the turbine casing segment.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 3 shows a cross-sectional view of an alignment member according to various embodiments of the invention.

Figure 1:
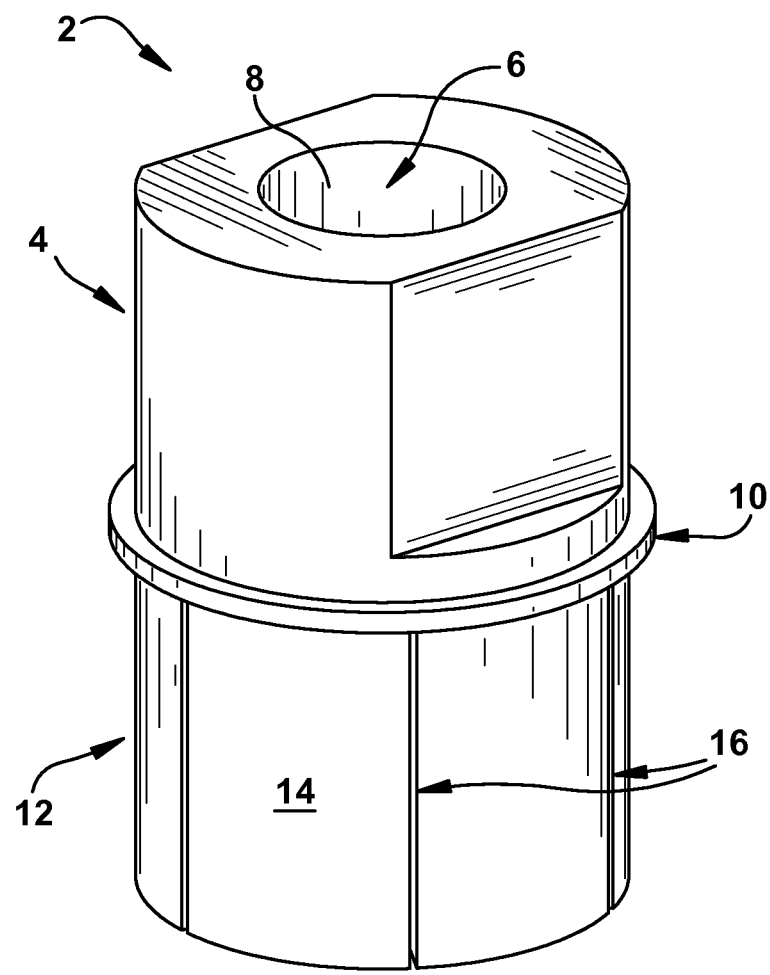
FIG. 1 shows a three-dimensional perspective view of an alignment pin according to various embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted, the subject matter disclosed herein relates to turbomachines. More particularly, aspects of the invention include alignment mechanisms for a turbomachine stage, such as a stage in a steam turbine.

As described herein, the centering pin in a conventional turbomachine is traditionally installed in an area of the diaphragm assembly with a small clearance. The centering pin is traditionally cooled (e.g., frozen) to a point in which it contracts to fit in this area of small clearance. This often requires the use of dry ice or another severe cooling mechanism during installation, e.g., in the field. However, the unavailability and relatively high cost of these severe cooling mechanisms can be undesirable.

In the conventional scenario, the centering pin is installed with a small degree (e.g., 0.0005-0.002 inches, or 0.0127-0.0508 millimeters) interference fit in a casing slot. In order to meet this small level of interference, the centering pin is cooled (e.g., until frozen) to a temperature below zero degrees Fahrenheit (F), e.g., as cold as −140 degrees F. As noted herein, it may be difficult to cool the centering pin to such a temperature, in particular, while the centering pin is installed on location. Additionally, freezing and thawing of the centering pin can cause mis-alignment of the turbine diaphragm.

In contrast to the conventional centering pin and related apparatuses, various embodiments of the invention include a centering pin apparatus for a turbomachine which does not require cooling to insert into the diaphragm slot. In various particular embodiments, the centering pin apparatus includes a sleeve having an internal aperture, such as a threaded internal aperture, extending at least partially therethrough. The internal aperture of the sleeve is designed to receive an expansion member for expanding a portion of the sleeve to fill the diaphragm slot.

It is understood that the term "sleeve" and "retainer" can be used herein to refer to a portion of the centering pin apparatus which fits within the diaphragm slot, and in some cases, expands to at least partially fill that diaphragm slot.

In various embodiments of the invention, the centering pin apparatus includes at least one expansion slot for expanding to receive the expansion member. The expansion slot(s) allow the apparatus to expand to receive the expansion member while expanding to at least partially fill the casing slot.

In various embodiments of the invention, the centering pin apparatus includes a sleeve with a tapered expansion slot, a head and a tapered expansion member which can substantially complement the tapered expansion slot. The sleeve with the tapered expansion slot can have a first inner diameter and a second inner diameter greater than the first inner diameter. The centering pin apparatus in these embodiments is designed such that the first inner diameter is located proximate the diaphragm.

In various particular embodiments of the invention, an alignment pin for a turbomachine is disclosed. In these embodiments, the alignment pin can include: a hollowed head section for engaging a diaphragm slot in the turbomachine; and an expandable sleeve section connected with the hollowed head, the expandable sleeve section for engaging a casing slot in the turbomachine.

In various alternative embodiments of the invention, an alignment apparatus for a turbomachine is disclosed. In these embodiments, the alignment apparatus can include: a hollowed head for engaging a diaphragm slot in the turbomachine; an expandable sleeve member connected with the hollowed head, the expandable sleeve having an inner slot, the expandable sleeve for engaging a casing slot in the turbomachine; and an expansion member within a portion of the inner slot, the expansion member for modifying an outer diameter of the expandable sleeve member within the casing slot.

In yet further embodiments of the invention, a turbomachine, such as a steam turbine, is disclosed. In these embodiments, the turbomachine can include: a turbine diaphragm segment; a turbine casing segment substantially containing the turbine diaphragm segment; and an alignment pin for aligning the turbine diaphragm segment with the turbine casing segment, the alignment pin including: a hollowed head section for engaging a slot in the turbine diaphragm segment; and an expandable sleeve section connected with the hollowed head, the expandable sleeve section for engaging a slot in the turbine casing segment.

Figure 2:
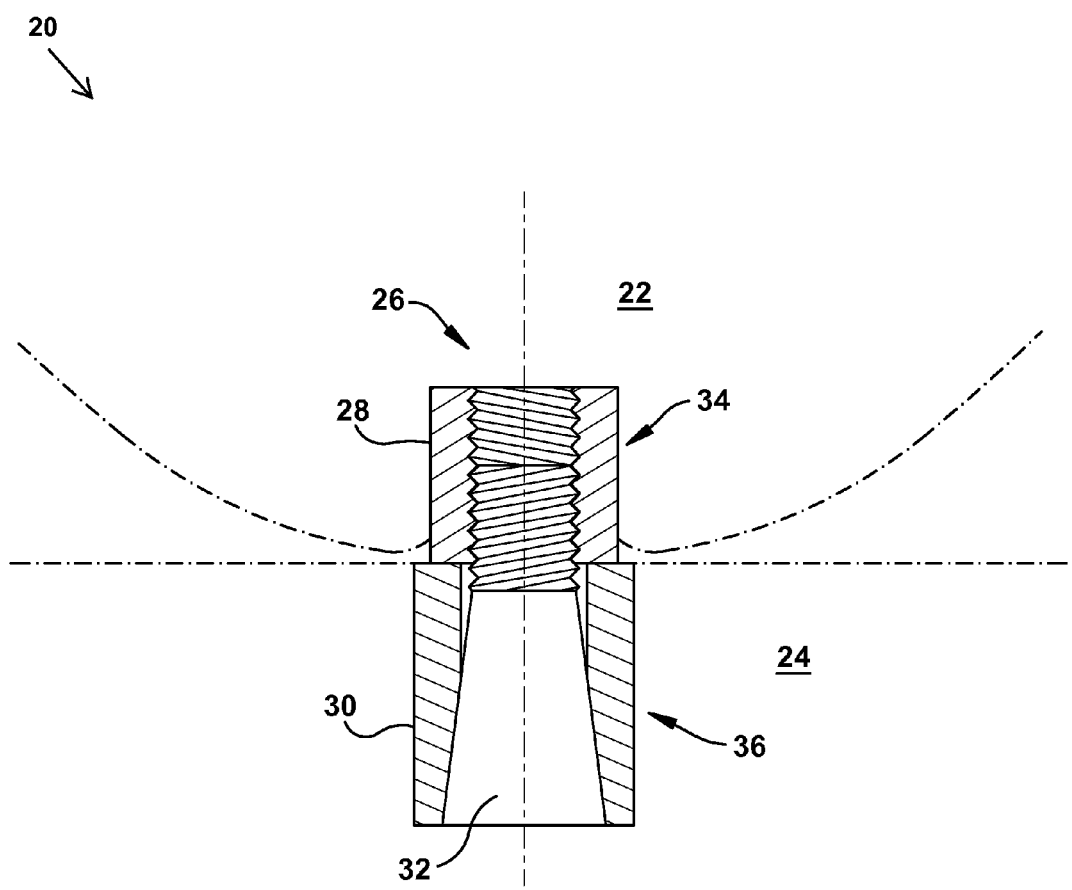
FIG. 2 shows a cross-sectional view of a portion of a turbine according to various embodiments of the invention.

Turning to FIG. 1, a three-dimensional perspective view of an alignment pin 2 for a turbomachine (e.g., a steam turbine, shown in FIG. 2) is shown according to various embodiments of the invention. In these embodiments, the alignment pin 2 can include a hollowed head section 4 for engaging a diaphragm slot in the turbomachine. The hollowed head section 4 can include an internal slot 6 for receiving an adjustment member, which is shown and described further herein. In some cases, the internal slot 6 has an inner surface 8 which is threaded, however, in other cases, the internal slot 6 can have an inner surface 8 which is substantially smooth. As shown, in various embodiments the hollowed head section 4 can include a lip 10 for engaging a surface of the casing wall in the turbomachine (FIG. 2).

Also shown in FIG. 1, the alignment pin 2 can include an expandable sleeve section 12 connected with the hollowed head section 4. In some embodiments, as shown in FIG. 1, the expandable sleeve section 12 is substantially unitary with the hollowed head section 4, that is, the expandable sleeve section 12 and the hollowed head section 4 are formed from a substantially continuous piece of material, e.g., a metal such as steel. In other embodiments, the hollowed head section 4 can be welded to the expandable sleeve section 12. The expandable sleeve section 12 is sized to engage a casing slot in the turbomachine casing (not shown).

As shown, the expandable sleeve section 12 can include a plurality of plates 14, each separated by at least one gap 16 (a plurality of gaps 16 shown). The plates 14 can be formed of a metal such as that of the remainder of the expandable sleeve section 12. The gaps 16 adjacent plates 14 can slide in a direction circumferentially about the expandable sleeve section 12, thereby expanding the diameter of the expandable sleeve section 12. This allows the expandable sleeve section 12 to expand to fill (or substantially fill) the casing slot in the turbomachine casing.

The expandable sleeve section 12 can include an inner aperture (obstructed from this view), which may include a threaded surface, a notched surface, or a substantially smooth surface. The inner aperture of the expandable sleeve section 12 can be fluidly connected with the internal slot 6 of the hollowed head section 4, that is, the internal slot 6 and the inner aperture (not shown) can form a substantially continuous aperture (or path) through at least a portion of the alignment pin 2.

As will be described further herein, in various embodiments of the invention, an expansion member can be inserted in the adjustment pin 2, and in some cases, can be screwed or otherwise tightened to fit within the internal slot 6 and the inner aperture of the adjustment pin 2. As the expansion member is inserted into the adjustment pin, it can force expansion (either incrementally or progressively) of the expandable sleeve section 12.

Turning to FIG. 2, a side cross-sectional view of a portion of a turbomachine (e.g., a steam turbine) 20 is shown according to various embodiments of the invention. As shown, the portion of the turbomachine 20 can include a diaphragm segment 22, and a casing segment 24 at least partially housing the diaphragm segment 22. The turbomachine 20 can also include an alignment pin 26 which can include a hollowed head section 28 and an expandable sleeve section 30, which can include some similar features as similarly named elements in the embodiments described with reference to FIG. 1. As shown, the alignment pin 26 can also include an adjustment member 32, which in these embodiments, is inserted within the body of the alignment pin 26, spanning between the hollowed head section 28 and the expandable sleeve section 30. The hollowed head section 28 can be sized to fit within (and substantially fill) a slot 34 within the diaphragm segment 22, and the expandable sleeve section 30 can be sized to fit within (and substantially fill) a slot 36 within the casing segment 24.

FIG. 3 shows a break-out view of the alignment pin 26 of FIG. 2, including the hollowed head section 28 separated from the expandable sleeve section 30. FIG. 3 also illustrates the adjustment member 32 separated from the expandable sleeve section 30. Also shown, the expandable sleeve section 30 includes at least one gap 38, which allows plates 14 of the expandable sleeve section 30 to shift relative to one another, thereby expanding an outer diameter of the expandable sleeve section. In some cases, as shown in the embodiment in FIG. 3, the adjustment member 32 includes a tapered section 37 having a first diameter D1 which is smaller than a second diameter D2. In some cases, the inner aperture 44 of the expandable sleeve section 30 is similarly tapered to receive a tapered section of the adjustment member 32. In various embodiments, as shown in FIG. 3, the hollowed head section 28 is a separate element (e.g., not physically bonded) from the expandable sleeve section 30.

Figure 4A:
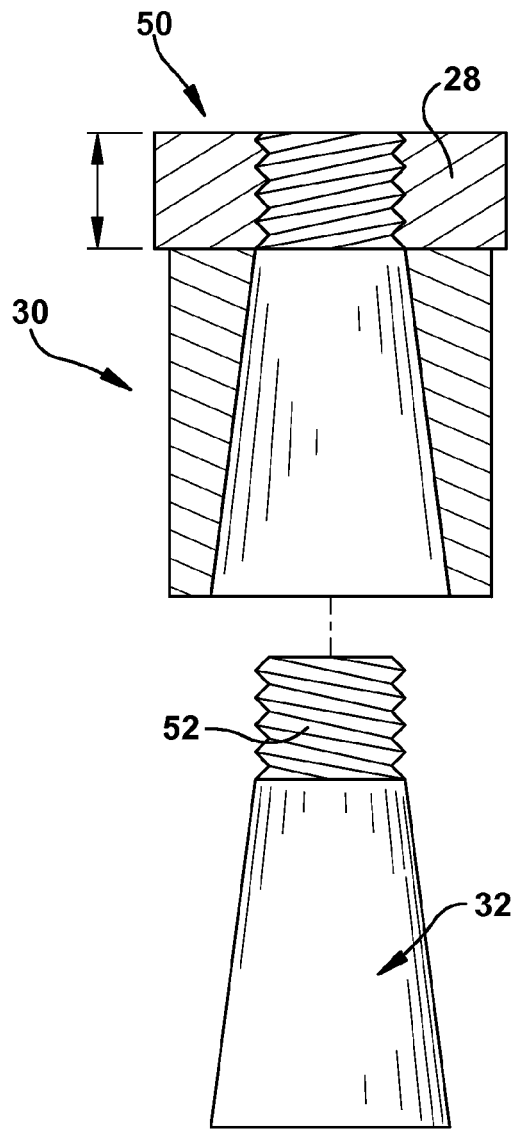
FIG. 4 shows a cross-sectional view of an alternative embodiment of an alignment member according to various embodiments of the invention.
Figure 4B:
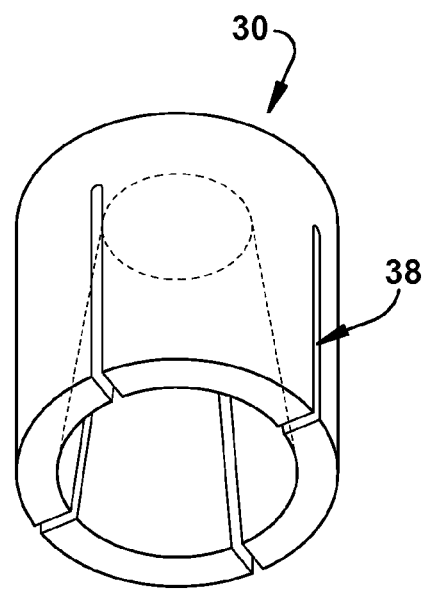

FIG. 4 shows a similar break-out view as in FIG. 3, except FIG. 4 illustrates an alternative embodiment of an alignment pin 50 in which the expandable sleeve section 30 and the hollowed head 28 are substantially unitary, e.g., bonded together or otherwise formed from a common piece of material such as a metal.

It is understood that while the adjustment member 32 of FIGS. 3-4 is shown as including a tapered section, the adjustment member 32 (and other adjustment members described herein) can include a substantially uniform profile, e.g., a non-tapered profile. The adjustment member 32 in some cases case be threaded, notched, or have other surface-roughening characteristics, but in some cases may be substantially smooth. In various embodiments, the adjustment member 32 is only threaded (or notched, or otherwise surface-roughened) in an upper region 52 which is sized to fit within the hollowed head 28. That is, this upper region 52 can be sized to interlock with a threaded inner surface of the hollowed head to retain the adjustment member 32 in the body of the alignment pin 50 (or other alignment pin 2 and/or alignment pin 26) described herein.

In any case, the alignment pins (and associated alignment apparatuses) shown and described herein allow for the alignment of a turbomachine casing and diaphragm while overcoming the various shortfalls of conventional pins (and apparatuses). The alignment pins (and associated alignment apparatuses) according to various embodiments of the invention have the technical effect of aligning a turbomachine apparatus in a controlled and progressive manner.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An alignment pin for a turbomachine, the alignment pin comprising:
    a hollowed head section for engaging a diaphragm slot in the turbomachine,
    the hollowed head section including a lip for engaging a surface of a casing wall in the turbomachine, the hollowed head section having an internal slot; and
    an expandable sleeve section connected with the hollowed head, the expandable sleeve section sized to engage a casing slot in the turbomachine,
    wherein the lip retains the hollowed head section in the diaphragm slot and the expandable sleeve section in the casing slot, and wherein the expandable sleeve section includes an inner aperture for receiving an expansion member, which when inserted into the alignment pin, forces expansion of the expandable sleeve section within the casing slot, and wherein the hollowed head section and the expandable sleeve section are substantially unitary.

2. The alignment pin of claim 1, wherein the inner aperture of the expandable sleeve section and the internal slot of the hollowed head section are fluidly connected.

3. The alignment pin of claim 1, wherein the expandable sleeve section includes an outer surface and at least one gap along the outer surface, the at least one gap providing for expansion of the expandable sleeve section.

4. The alignment pin of claim 1, wherein the lip separates the expandable sleeve section from the hollowed head section.

5. An alignment apparatus for a turbomachine, the alignment apparatus comprising:
    a hollowed head for engaging a diaphragm slot in the turbomachine,
    the hollowed head section including a lip for engaging a surface of a casing wall in the turbomachine, the hollowed head section having an internal slot;
    an expandable sleeve member connected with the hollowed head, the expandable sleeve having an inner aperture, the expandable sleeve member sized to engage a casing slot in the turbomachine,
    wherein the lip retains the hollowed head section in the diaphragm slot and the expandable sleeve section in the casing slot; and
    an expansion member within the inner aperture of the expandable sleeve member, the expansion member forcing expansion of the expandable sleeve member as the expansion member is inserted in the expandable sleeve member, for modifying an outer diameter of the expandable sleeve member within the casing slot, and wherein the hollowed head and the expandable sleeve form a substantially unitary member.

6. The alignment apparatus of claim 5, wherein the expandable sleeve includes a tapered slot fluidly connected with a hollowed portion of the hollowed head.

7. The alignment apparatus of claim 6, wherein the expansion member includes a tapered expansion member sized to engage the tapered slot and the hollowed portion of the hollowed head.

8. The alignment apparatus of claim 7, wherein the tapered expansion member includes a threaded screw member, and the hollowed portion of the hollowed head includes a threaded surface for mating with the threaded screw member.

9. The alignment pin of claim 5, wherein the lip separates the expandable sleeve section from the hollowed head section.

10. A turbomachine comprising:
    a turbine diaphragm segment;
    a turbine casing segment substantially containing the turbine diaphragm segment; and
    an alignment pin for aligning the turbine diaphragm segment with the turbine casing segment, the alignment pin including:
        a hollowed head section for engaging a slot in the turbine diaphragm Segment,
        the hollowed head section including a lip for engaging a surface of a wall of the turbine casing segment, the hollowed head section having an internal slot;
        an expandable sleeve section connected with the hollowed head, the expandable sleeve section sized to engage a slot in the turbine casing segment, the expandable sleeve section having an inner aperture, wherein the lip retains the hollowed head section in the slot in the turbine diaphragm segment and the expandable sleeve section in the slot in the turbine casing segment; and an expansion member in the inner aperture of the expandable sleeve section, which when inserted into the expandable sleeve section, forces expansion of the expandable sleeve section within the slot in the turbine casing, wherein the hollowed head section and the expandable sleeve section are substantially unitary.

11. The turbomachine of claim 10, wherein the expandable sleeve section includes an outer surface and at least one gap along the outer surface, the at least one gap providing for expansion of the expandable sleeve section.

12. The turbomachine of claim 10, wherein the lip separates the expandable sleeve section from the hollowed head section.

\* \* \* \* \*